(12) United States Patent
Lequire, Jr.

(10) Patent No.: US 7,896,353 B2
(45) Date of Patent: Mar. 1, 2011

(54) LARGE DIAMETER SEALS

(75) Inventor: Vester J. Lequire, Jr., Franklin, NC (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 12/701,270

(22) Filed: Feb. 5, 2010

(65) Prior Publication Data

US 2010/0133759 A1    Jun. 3, 2010

Related U.S. Application Data

(62) Division of application No. 11/427,381, filed on Jun. 29, 2006, now Pat. No. 7,681,295.

(51) Int. Cl.
*F16J 15/32* (2006.01)
*B21D 25/00* (2006.01)

(52) U.S. Cl. ....................... 277/573; 29/469.5

(58) Field of Classification Search ............... 29/469.5, 29/460, 469; 277/573, 560
See application file for complete search history.

(56) References Cited

U.S. PATENT DOCUMENTS

| | | | |
|---|---|---|---|
| 2,172,325 A | 9/1939 | Victor et al. | |
| 2,692,786 A | 10/1954 | Reynolds | |
| 2,834,616 A | 5/1958 | Gebert et al. | |
| 2,950,135 A | 8/1960 | Adamson | |
| 3,012,829 A | 12/1961 | Marshall | |
| 3,044,786 A | 7/1962 | Chillson | |
| 3,624,809 A | 11/1971 | Beninga | |
| 3,682,488 A | 8/1972 | Matsushima | |
| 3,930,655 A | 1/1976 | Fern | |
| 3,971,565 A | 7/1976 | Schickling et al. | |
| 4,208,057 A | 6/1980 | Messenger | |
| 4,274,641 A | 6/1981 | Cather, Jr. | |
| 4,311,316 A | 1/1982 | Cather, Jr. | |
| 4,410,190 A * | 10/1983 | Potter ........................ 277/559 |
| 4,623,153 A | 11/1986 | Nagasawa | |
| 4,721,314 A | 1/1988 | Kanayama et al. | |
| 4,936,591 A | 6/1990 | Romero | |
| 5,024,450 A | 6/1991 | Hawley et al. | |
| 5,326,111 A | 7/1994 | Hatch | |
| 5,884,919 A | 3/1999 | Saito | |
| 5,915,696 A | 6/1999 | Onuma et al. | |
| 5,975,538 A | 11/1999 | Krause et al. | |
| 6,182,975 B1 | 2/2001 | Matsushima et al. | |
| 6,464,228 B1 | 10/2002 | Oldenburg | |
| 6,719,298 B2 * | 4/2004 | Riedl et al. ................ 277/435 |
| 6,830,641 B2 | 12/2004 | Kosty et al. | |
| 6,945,537 B2 | 9/2005 | Guillerme et al. | |
| 6,991,234 B2 | 1/2006 | Oldenburg | |

(Continued)

OTHER PUBLICATIONS

International Searching Authority, Written Opinion and International Search Report of the International Searching Authority of International Application No. PCT/US07/72311, Sep. 23, 2008, ISA/US.

*Primary Examiner*—John C Hong
(74) *Attorney, Agent, or Firm*—Vedder Price P.C.

(57) ABSTRACT

A large diameter seal having a band of elastic material on its outer diameter to insure a complete and effective sealing in the counterbore and a method for manufacturing this large diameter seal having elastomeric material on its outer diameter.

5 Claims, 2 Drawing Sheets

U.S. PATENT DOCUMENTS 6,997,461 B2 2/2006 Smith et al.
2004/0239041 A1 12/2004 Morimoto et al.
2005/0134004 A1 6/2005 Yoon
2005/0167975 A1 8/2005 Skinner
2005/0242521 A1 11/2005 Bock et al.

* cited by examiner

LARGE DIAMETER SEALS

CROSS-REFERENCE TO RELATED APPLICATION

This application is a divisional of co-pending U.S. patent application Ser. No. 11/427,381, entitled METHOD OF MAKING IMPROVED LARGE DIAMETER SEALS, filed on Jun. 29, 2006, which is hereby incorporated herein in its entirety by reference.

BACKGROUND OF THE INVENTION

The present invention relates to large diameter seals and, more particularly, to large diameter seals having thin, pliable coatings on their outside diameters, and methods of making such seals. In general, this process can be performed on any so-called assembled seal.

Ordinary oil seals of from, perhaps, one inch to six inches in diameter, are made from a rigid casing and have bonded rubber lips of various kinds. Such seals are usually produced by compression molding, transfer molding or injection molding the rubber portion onto a steel, aluminum or like casing. Large diameter seals, for example, those of eight inches to sixty inches or more in diameter, are far too big to be economically manufactured by such a molding process. In other words, trying to inject rubber in a mold having an inside diameter of at least eight inches, but usually 12 inches up to 60 inches or more in diameter, would be very awkward, expensive, and impractical. To make such a mold would be extremely costly, especially considering that the mold would ordinarily be very seldom used.

In a regular or small diameter oil seal, the casing is made from a stamping or drawing. Such seals have either a metal or rubber OD ("outside diameter"). However, a large diameter seal is customarily made by a different method, with such method involving forming the casing in one step by a spinning operation, wherein the two radial flanges surround a major or axial portion of the casing. Thus, the casing is formed by placing a ring of metal in a spinning apparatus and spinning or bending the flanges thereon to form a generally U-shaped casing, as is well known in the art.

Thereafter, a portion of the elastomeric seal body is formed separately, cut into whatever overall length is desired, the end portions are bonded to each other to create a closed loop, and thereafter, the elastomeric portion is placed within the casing, and secured thereto by clinching. The resulting seal, which may be made with or without a garter spring, or in some cases with an embedded garter spring, is then ready to be used.

However, the present invention uses a different method. The seal is desired to have a rubber outside diameter (OD), for several important reasons. Installing a large diameter seal in a seal-receiving area, customarily a counterbore on a large machine such as a the rollers in a paper mill, steel mill or some other such application, because of the size of the seal, is customarily difficult. When the seal is even slightly too small for the application, it allows leakage between the counterbore and the OD of the casing. This is also the case with irregularities in the surface. If the seal is too large, the seal is unable to be installed, because the line-to-line contact necessary is extremely difficult to obtain. It is customary for such a large diameter seal-receiving area to be required to be free from nicks, scratches or the like, and as a result, installing such seals correctly becomes a major operation, particularly if the machine on which it is to be installed is old or has suffered from lack of maintenance.

Consequently, there has been a desire to manufacture a large diameter seal which would enable the secondary seal or the outside diameter of the seal to the counterbore to be completely and effectively sealed. Such a seal would also require a chamfer on at least one surface of its outside diameter, in addition preferably to being made from an elastomeric material which would be able to accommodate a slight out-of-round condition or other irregularities in the seal-receiving counterbore.

Accordingly, it is an object of the present invention to provide an improved large diameter seal.

Another object is to produce a large diameter seal, which includes a band of elastomeric material on its outside diameter.

Another object is to provide a method of creating an outside diameter rubber seal without creating a large-diameter mold, and which would not require equipment other than that required to make the remainder of the seal itself.

A still further object would be to provide a seal which would accommodate small imperfections in the installed or outside diameter, including an out-of-round condition or having nicks or other irregularities in the OD.

A still further object is to provide a method which involves creating an elastomeric seal band by bonding the end portions of a continuous strip of thin, elastomeric material into a closed loop, placing a bonding adhesive on the casing, and thereafter stretching the rubber band thus made into a larger diameter, allowing it to spring back and cling to the outside diameter of the casing, and then trimming one or both edges to provide a chamfer to accommodate and simplify the installation of such a seal.

A further object of the invention is to provide a rubber OD on a seal which would thereafter allow for improved ease of installation and removal, and would not damage the customer's hardware.

An object of the invention is to develop a rubber material for the OD of a seal which allows a certain amount of compression set during installation but thereafter remains resilient indefinitely.

Another object would be to provide an improved, rubber outside diameter seal which is especially useful in steel production, mining, pulp and paper and other industries generally requiring large diameter seals.

A still further object would be to provide a large diameter seal having a greatly reduced press-in or installing force, and a reduced extraction force.

A related object is to provide a seal which can be reinstalled without leaking in the application after removal from the counterbore.

Another object is to provide a seal which could compensate for an out-of-round or worn condition of the counterbore in which it is received.

A further object is to provide a seal which will not cause any damage to its associated counterbore, even during extraction.

A still further object is to provide a seal which has an outside diameter lead-in chamfer or radius.

SUMMARY OF THE INVENTION

The invention achieves its objects and others by providing an improved seal and method for making it, including unrolling a portion of rubber shim stock, cutting the shim stock to a smaller length than that required to encircle the outside diameter of the seal, bonding the ends together, stretching the seal over the casing, bonding shim stock to the casing and thereafter trimming the rubber to impart chamfers to one or both sides, thereby compensating for worn or out-of-round conditions or imperfections in the counterbore in which it is to be installed, and which therefore eliminates any damage to the bore during subsequent extraction.

The exact manner in which these advantages and objects and others which are inherent in the invention are achieved in practice will become more clearly apparent when reference is made to the following detailed description of the invention set forth by way of example and shown in the accompanying drawings in which like reference numbers indicate corresponding parts throughout.

DESCRIPTION OF THE PREFERRED EMBODIMENTS OF THE INVENTION

While the invention may be practiced by the illustrated methods or by somewhat different methods, and the seal made thereby has several features of novelty, an illustration will be given of one preferred method of making a seal, and the resulting seal having a rubber OD with a selected amount of shim stock bonded thereto.

Figure 1:
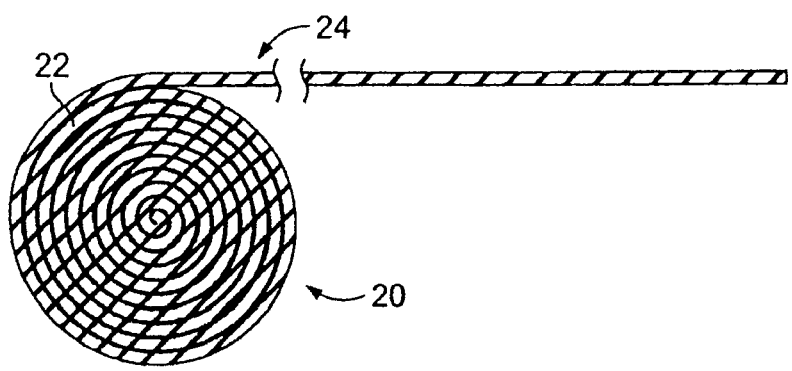
FIG. 1 is a schematic illustration of the so-called rubber shim stock, which is received in large diameter coils and of which a portion is shown just beginning to be unrolled from the coil.
Figure 2:
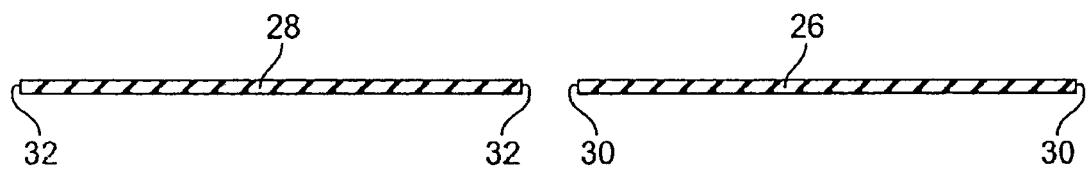
FIG. 2 schematically illustrates plural, equal lengths of the rubber shim stock being cut after being taken from the coil.
Figures 3, 4:
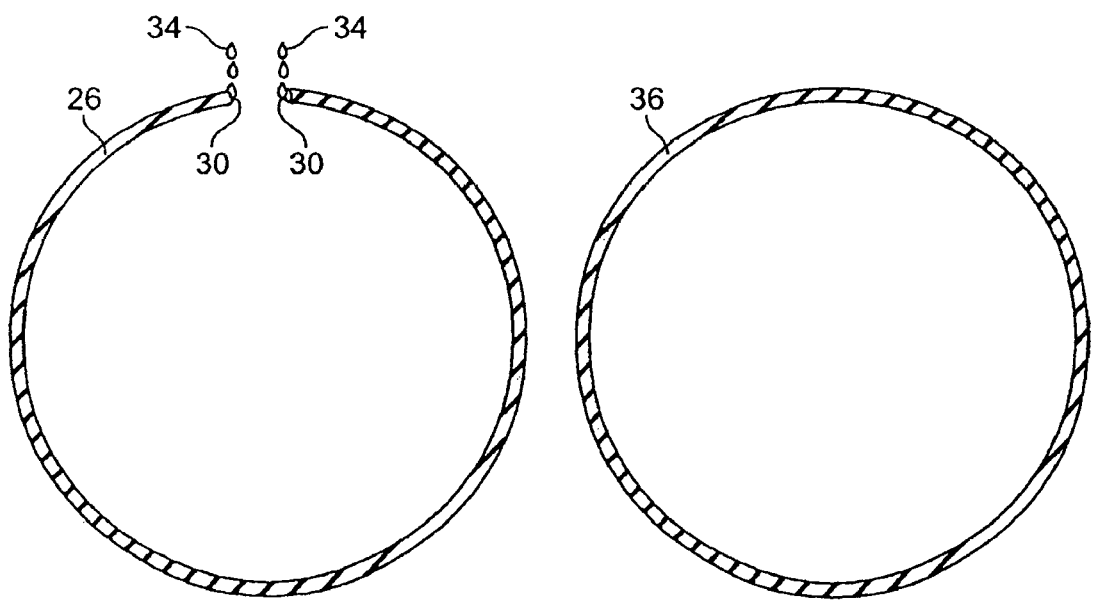
FIG. 3 is a schematic vertical sectional view of the rubber shim stock, showing liquid adhesive being affixed to the two end portions thereof, and showing the shim stock about to be formed into a circular loop.
FIG. 4 is a schematic vertical sectional view showing the end portions of the rubber shim stock when the ends are fully bonded to each other to form a circular loop.

Referring now to the drawings in greater detail, there shown in FIG. 1 a coil generally designated 20 of rubber so-called shim stock 22. This shim stock 22 is shown as being unrolled at 24 wherein an individual piece is taken from a much longer roll. It will be understood that this drawing is schematic and that the shim stock in question, usually 0.094 inches in thickness, comes in several hundred foot lengths. In this case, for illustration, the shim stock is cut into two individual pieces 26, 28, (FIG. 2) each having end portions 30, 32 spaced apart in selected, predetermined lengths. The lengths 26, 28 of each section of shim stock are treated successively. In FIG. 3, there is shown one such piece 26 having two end portions 30, 30 in the presence of a liquid adhesive 34. The first liquid adhesive 34 is a powerful, contact adhesive which enables the two ends 30, 30 to be bonded together into a continuous loop 36 as shown in FIG. 4.

Figure 5:
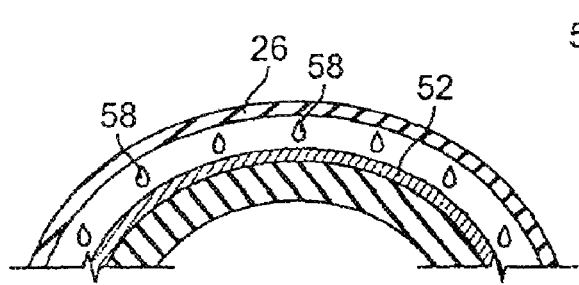
FIG. 5 schematically shows a circular piece of rubber shim stock being stretched to a larger radius so as to fit over a casing, showing the manner in which the liquid adhesive is added to the OD of the metal casing, and showing the rubber shim stock in the process of being allowed to return to just more than its totally relaxed diameter.
Figure 6:
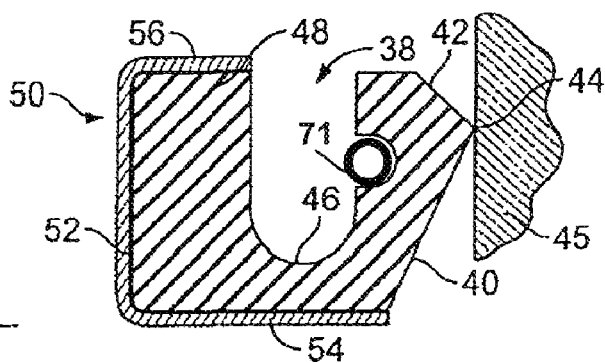
FIG. 6 is a vertical sectional view of a seal casing with the rubber comprising the seal body already inserted into the steel casing and bonded in place.
Figure 7:
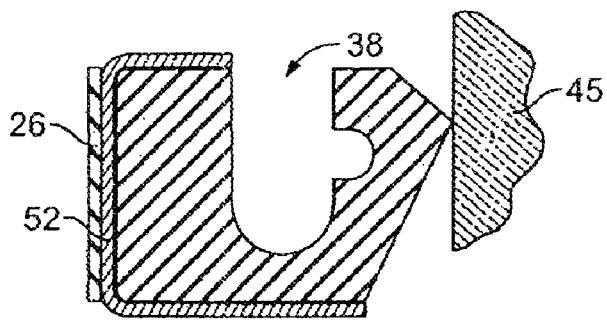
FIG. 7 shows the casing with the rubber shim stock bonded thereto by the use of the adhesive shown in FIG. 5.

FIG. 4 shows the completed loop 36 made by bonding two ends of the loop 30, 30 together. FIGS. 5, 6 and 7 show the next steps in the process. FIG. 6 is a drawing showing a cross section of a large diameter seal. Here, there are shown the main components of a large diameter seal, namely, the body generally designated 38, and including frusto-conical air and oil side surfaces 40, 42 meeting along a line of intended contact 44 with the shaft 45. These surfaces are sometimes referred to as the inside face, or oil side 42 of the seal, and as the outside face, or air side 40 of the seal. The seal body of 38 is shown to include a curvilinear, generally somewhat circular, contoured opening 46 and an upper or radially outward portion 48 of the seal body 38. This seal body or elastomeric portion 38 is received within a casing generally designated 50 and shown to include a principal, axial portion 52 and a pair of radial flanges 54, 56. Also shown is garter spring 71 which can optionally be installed or embedded to seal body 38.

These flanges 54, 56 are produced by spinning the an originally flat portion 52 until the correct curvature and the desired flanges 54, 56 are obtained. Thereafter, the seal body 38 is formed and placed within the casing generally designated 50. Needless to say, the seal could be reversed and the flanges directed outwardly.

Referring now to FIG. 5, there is shown a stretched portion of rubber shim stock surrounding the portion 52 of the casing. The rubber portion 26 is shown as being somewhat spaced apart from the axial portion 52 of the casing. Liquid adhesive 58 is shown schematically as being deposited on the axial portion 52 of the casing, and the piece of shim stock 26 as having had its end portions secured together. A loop 26 is then formed and the loop 26 having been stretched to a larger diameter than that of the flange 52. The forces holding the shim stock spaced apart from the flange 52 are then released, allowing the shim stock 26 to contact the casing 50 through the adhesive. In FIG. 7, it is shown that the shim stock is now bonded to the casing, and has become a permanent fixture.

Figure 8:
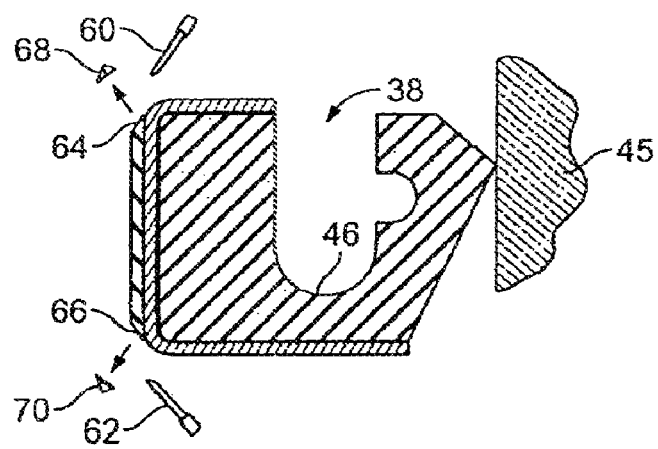
FIG. 8 shows the rubber OD being trimmed to impart a chamfer to the shim stock on both axial sides of the seal.

Referring now to FIG. 8, there are shown two knives 60, 62, which are positioned spaced apart but adjacent the edge portions 66, 68 of the shim stock, and they are thereafter moved into position so as to trim these edges 64, 66. This cuts out small strips 68, 70, from the shim stock 26 overlying the axial portion 52 of the casing 50. Thereupon, the new large diameter seal is ready for installation.

Referring now to certain aspects of the invention and the method of performing it, preferably the rubber used is initrile (Buna N) rubber, but other synthetic rubbers and other rubbers such as natural rubber, silicone rubbers and other kinds of rubber could be used. The adhesive 34 used is a fast setting, clear cyanoacrylate adhesive, which bonds the rubber ends together and which is further identified as a room-temperature curing adhesive, for example, Locktite 420. This rubber is ready for the next step almost immediately. This loop of rubber is then sanded lightly to render the surface suitable for bonding with the next adhesive. The rubber is stripped of any residual oil.

The second process starts by cleaning the metal of any oil, etc. used in forming the metal casing. Next, applying the rubber to the casing 50—is done by applying a similar adhesive—Locktite brand 4212 or 4211, to the metal casing. Both adhesives are described as thermally resistant (250° F.) high viscosity toughened adhesives. The next step involves stretching the one-piece band 26 of rubber to about 105% to 125% of its relaxed length, and covering the casing with such rubber band. The rubber should have no less length than 102%, and up to 110%, of the length in its relaxed condition. The bond will form in about 5 minutes, and the joint is then allowed to cure for 24 hours.

After a suitable curing period of 24 hours or more, the knives or razor blades may be used to trim the chamfer on one or both sides of the rubber OD coating. Normally, this is done by placing the inclined blade on the edge of the casing and rotating the casing until the margin of the rubber have been trimmed off. A 30 degrees from the horizontal is preferred.

It will thus be seen that the invention provides a novel seal and method having a number of advantages and characteristics, including those herein pointed out and other which are inherent in the invention.

What is claimed is:

1. An assembled oil seal including a generally U-shaped metal casing having a pair of radial side flanges, each flange being attached integrally to an axially extending end portion, said metal casing having a first elastomeric component in the form of a seal body received therein and crimped permanently to each of said flanges and said end portion, said seal body having frusto-conical air and oil side surfaces meeting along a seal band of intended contact with an associated shaft, said seal also having bonded to an exterior surface of said end portion of said casing, a second elastomeric component in the form of a thin, continuous strip of an elastomer, said second elastomeric component having a thickness of at least 0.02 inches and not more than 0.125 inches, said second elastomeric component having both of its end portions permanently bonded to each other, said second elastomeric component being thereby stretched when installed to at least 102% of its length in a relaxed condition.

2. An oil seal as defined in claim 1 wherein said seal has an outside diameter of at least 8 inches.

3. An oil seal as defined claim 1 which includes a garter spring received within said first elastomeric component.

4. An oil seal as defined claim 1 wherein said second elastomeric component has a thickness of from about 0.06 inches to about 0.10 inches.

5. An oil seal as defined claim 1 wherein residual stress in said second elastomeric component is 103% to about 110% of the stress in a relaxed condition.

* * * * *